United States Patent
Asanuma et al.

(10) Patent No.: US 6,750,811 B2
(45) Date of Patent: Jun. 15, 2004

(54) DETECTION OF OCCURRENCE OF HORIZONTAL DISPLACEMENT OF RADAR AXIS, DETERMINATION OF AMOUNT OF AXIS DISPLACEMENT, AND CORRECTION OF AXIS DISPLACEMENT

(75) Inventors: Hisateru Asanuma, Kobe (JP); Masayuki Kishida, Kobe (JP)

(73) Assignee: Fujitsu Ten Limited, Hyogo (JP)

(*) Notice: Subject to any disclaimer, the term of this patent is extended or adjusted under 35 U.S.C. 154(b) by 0 days.

(21) Appl. No.: 10/215,865

(22) Filed: Aug. 9, 2002

(65) Prior Publication Data

US 2003/0034913 A1 Feb. 20, 2003

(30) Foreign Application Priority Data

Aug. 15, 2001 (JP) .................. 2001-246651

(51) Int. Cl.⁷ .................. G01S 7/40; G01S 13/93
(52) U.S. Cl. .................. 342/174; 342/70; 342/118; 342/128; 342/165; 342/173; 342/175; 342/195
(58) Field of Search .................. 342/27, 28, 118, 342/70–72, 128–133

(56) References Cited

U.S. PATENT DOCUMENTS

| | | | |
|---|---|---|---|
| 3,582,950 A | * 6/1971 | Tanaka et al. | 342/363 |
| 4,800,387 A | * 1/1989 | Joy | 342/165 |
| 5,107,269 A | * 4/1992 | Labozzetta | 342/77 |
| 5,495,254 A | 2/1996 | Uemura et al. | |
| 5,670,963 A | 9/1997 | Kubota et al. | |
| 5,832,407 A | 11/1998 | Kai et al. | |
| 5,905,463 A | * 5/1999 | Hannan | 342/373 |
| 5,977,906 A | * 11/1999 | Ameen et al. | 342/174 |
| 6,025,797 A | 2/2000 | Kawai et al. | |
| 6,356,229 B1 | 3/2002 | Schneider | |
| 2002/0165650 A1 | 11/2002 | Michi et al. | |

FOREIGN PATENT DOCUMENTS

| | | |
|---|---|---|
| DE | 196 10 351 A1 | 9/1996 |
| DE | 196 33 704 A1 | 10/1997 |
| DE | 198 33 065 A1 | 1/1999 |
| DE | 197 51 004 A1 | 5/1999 |
| DE | 199 52 056 A1 | 5/2001 |
| DE | 199 64 020 A1 | 7/2001 |
| GB | 2 334 842 A | 9/1999 |
| JP | 06160510 A | 6/1994 |
| JP | 11142520 A | 5/1999 |
| WO | WO 01/31362 A1 | 5/2001 |

OTHER PUBLICATIONS

Corresponding European Patent Application Search Report, dated Dec. 4, 2002.

* cited by examiner

Primary Examiner—Bernarr E. Gregory
(74) Attorney, Agent, or Firm—Christie, Parker & Hale, LLP

(57) ABSTRACT

The occurrence of an axis displacement in a horizontal direction in a vehicle-to-vehicle distance controlling radar is detected, the amount of the axis displacement is determined, and an azimuth angle is corrected using the thus determined amount of the axis displacement. The frequency with which vehicle-to-vehicle distance control is released or re-set is measured and, if the frequency is higher than a threshold, it is determined that the axis is displaced. The amount of the axis displacement is determined from the angle of the locus of a stationary target. The azimuth angle of the target is corrected using the thus determined axis displacement angle.

15 Claims, 8 Drawing Sheets

DETECTION OF OCCURRENCE OF HORIZONTAL DISPLACEMENT OF RADAR AXIS, DETERMINATION OF AMOUNT OF AXIS DISPLACEMENT, AND CORRECTION OF AXIS DISPLACEMENT

CROSS-REFERENCE TO RELATED APPLICATION

This application claims priority of Japanese Patent Application No. 2001-246651, filed on Aug. 15, 2001.

BACKGROUND OF THE INVENTION

1. Field of the Invention

The present invention relates to detection of the occurrence of an axis displacement in a horizontal direction in a radar mounted on a vehicle, determination of the amount of the axis displacement in the horizontal direction, and correction of the axis displacement in the horizontal direction.

2. Description of the Related Art

A certain type of automotive radar is capable of detecting, in addition to the distance R to a target and the relative velocity V of the target, the lateral position X of the target by electronically or mechanically scanning the radiowave projection direction and thereby detecting the azimuth angle θ of the target, the lateral position X being determined by solving the equation X=R·sin θ. By detecting the lateral position X, it becomes possible to control vehicle-to-vehicle distance based on the distance and relative velocity of a vehicle traveling ahead of the radar-equipped vehicle.

After such an automotive radar has been installed in a vehicle, if the radar axis is displaced in a horizontal direction by an external force exerted for some reason, a displacement will occur in the azimuth angle θ of the target, resulting in erroneous recognition of a target, the distance to which is being controlled.

SUMMARY OF THE INVENTION

It is an object of the present invention to provide an apparatus capable of detecting the occurrence of an axis displacement in a horizontal direction in a radar mounted on a vehicle, an apparatus capable of determining the amount of the axis displacement in the horizontal direction, and an apparatus capable of correcting the axis displacement in the horizontal direction.

An apparatus for detecting the occurrence of an axis displacement in a horizontal direction in a radar mounted on a vehicle, according to the present invention comprises: means for measuring the frequency with which vehicle-to-vehicle distance control, being performed using the radar, is released or re-set; and means for determining that the axis of the radar is displaced in the horizontal direction when the measured control release or re-set frequency is higher than a predetermined threshold.

An apparatus for determining the amount of an axis displacement in a horizontal direction in a radar mounted on a vehicle, according to the present invention, comprises: means for recognizing that a target detected by the radar is a stationary target; and means for determining the amount of the axis displacement in the horizontal direction, based on the locus of the target recognized as being a stationary target.

An apparatus for correcting an axis displacement in a horizontal direction in a radar mounted on a vehicle, according to the present invention, comprises: means for recognizing that a target detected by the radar is a stationary target; means for determining the amount of the axis displacement in the horizontal direction, based on the locus of the target recognized as being a stationary target; and means for correcting azimuth angle of the target by using the determined amount of the axis displacement in the horizontal direction.

DESCRIPTION OF THE PREFERRED EMBODIMENTS

Figure 1:
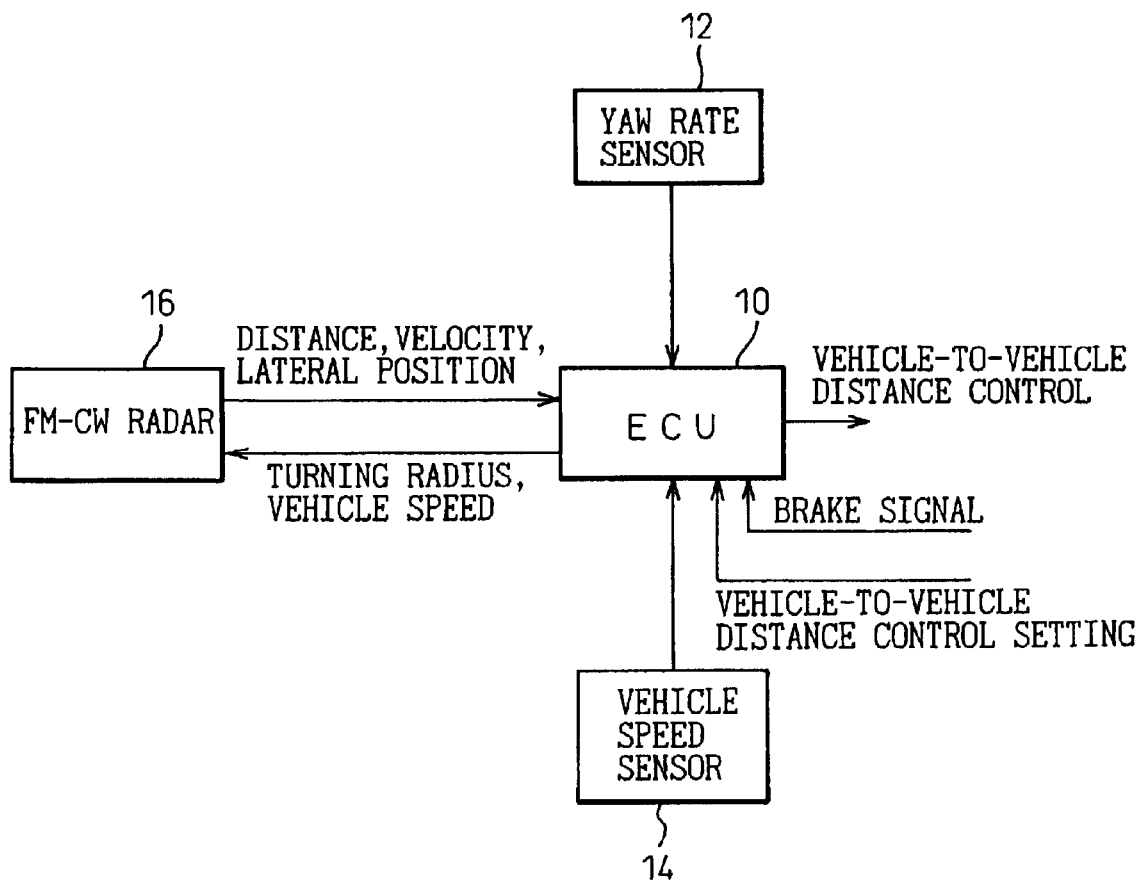
FIG. 1 is a diagram showing the configuration of a vehicle-to-vehicle distance controlling radar.

FIG. 1 shows the configuration of a vehicle-to-vehicle distance controlling radar as one example of a radar to which the present invention is applied.

In FIG. 1, an ECU 10 calculates the turning radius of the radar-equipped vehicle based on a signal from a yaw rate sensor 12 and a signal from a vehicle speed sensor 14, and supplies the result to an FM-CW radar 16 together with vehicle speed data. The FM-CW radar 16 projects a radiowave in the millimeter wave band, frequency modulated by a triangular wave, in the forward direction of the vehicle and calculates the distance and relative velocity of a target located ahead. Further, the FM-CW radar 16 scans the projection direction of the radiowave as earlier described, calculates the lateral position of the target from the power distribution of the reflected wave, and supplies the result to the ECU 10 together with the distance and relative velocity data. Based on these data, the ECU 10 generates and outputs a control signal for maintaining a constant distance from the vehicle traveling ahead. The ECU 10 is also supplied with a brake signal and a vehicle-to-vehicle distance control set signal. Vehicle-to-vehicle distance control is started by the vehicle-to-vehicle distance control set signal, and stopped by the brake signal.

Figure 2:
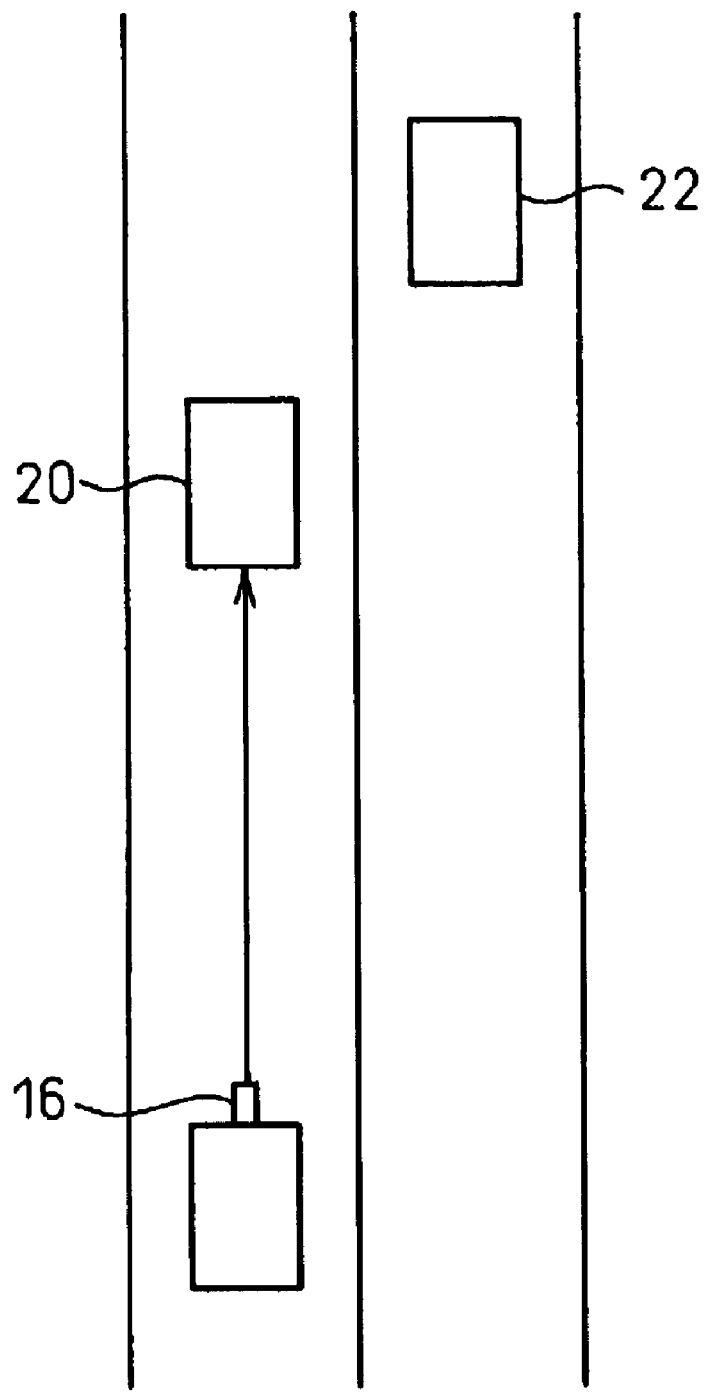
FIG. 2 is a diagram for explaining an axis displacement in a horizontal direction.

As shown in FIG. 2, when the FM-CW radar 16 is correctly installed, a target 20 traveling ahead in the same lane as the radar-equipped vehicle is correctly recognized, and the vehicle-to-vehicle distance control is correctly performed based on the distance and relative velocity of the target 20.

Figure 3:
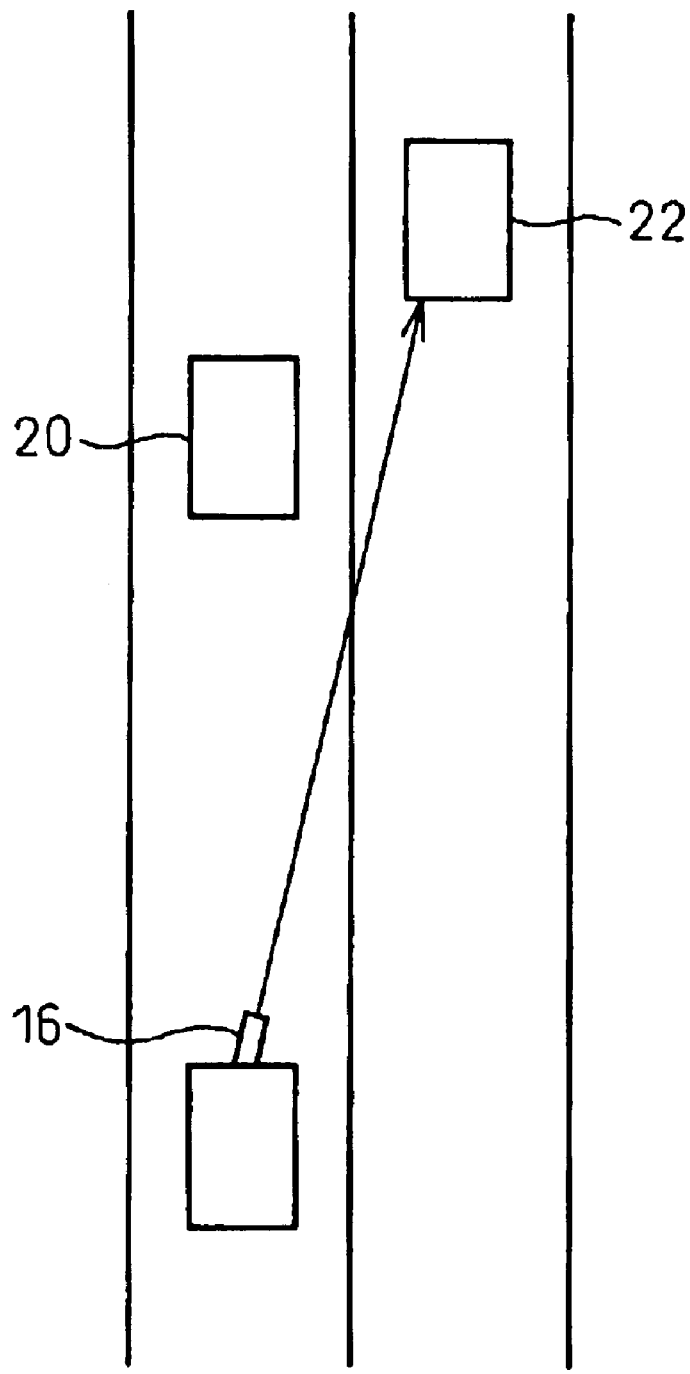
FIG. 3 is a diagram for explaining an axis displacement in a horizontal direction.

On the other hand, if the axis of the radar 16 is displaced in a horizontal direction, as shown in FIG. 3, the lateral positions of the targets 20 and 22 cannot be recognized correctly and, in an extreme case, the target 22 traveling in a neighboring lane is erroneously recognized as being the target traveling in the path ahead of the radar-equipped car.

In this case, as the distance to the target 20 is not recognized correctly, the distance to the vehicle traveling ahead may become too close; each time this happens, the driver has to depress the brake pedal and then has to re-set the control when the proper distance is regained, that is, the operation to release the vehicle-to-vehicle distance control by depressing the brake pedal and the operation to re-set the control are performed frequently. Therefore, by measuring the frequency with which the vehicle-to-vehicle distance control is released or re-set, the occurrence of an axis displacement in a horizontal direction in the radar 16 can be detected. For example, the brake signal or the vehicle-to-vehicle distance control set signal (FIG. 1) input to the ECU 10 is counted by a counter which is reset periodically and, if the count value exceeds a predetermined value, it is determined that an axis displacement in a horizontal direction has occurred. This processing can also be implemented using software.

Figure 4:
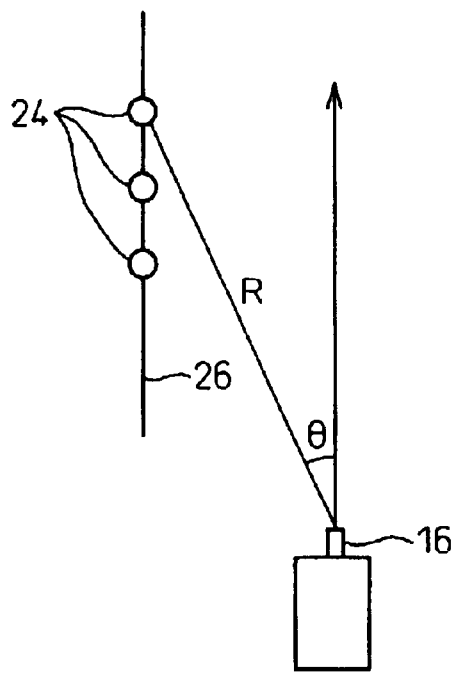
FIG. 4 is a diagram for explaining how the amount of the axis displacement in the horizontal direction is determined.

Next, a description will be given of how the amount of the axis displacement in the horizontal direction is determined. If the relative velocity of a target is substantially equal to the traveling speed of the radar-equipped vehicle, the target is recognized as being stationary. If there is no axis displacement in the horizontal direction, the locus 26 of the relative position determined by the distance R and azimuth angle $\theta$ of the target 24 (for example, an electric light pole) recognized as being stationary should be a straight line with an azimuth angle of 0, as shown in FIG. 4. Accordingly, the angle $\Delta\theta$ of the axis displacement in the horizontal direction can be determined from the angle of the locus 26 of the stationary target 24.

Figure 5:
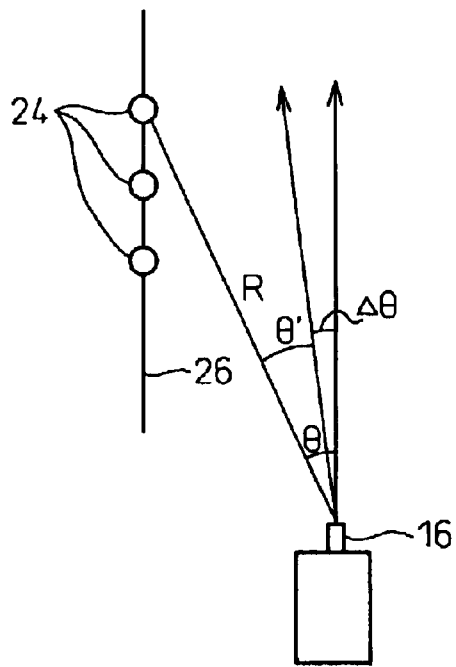
FIG. 5 is a diagram for explaining how the amount of the axis displacement in the horizontal direction is determined.
Figure 6:
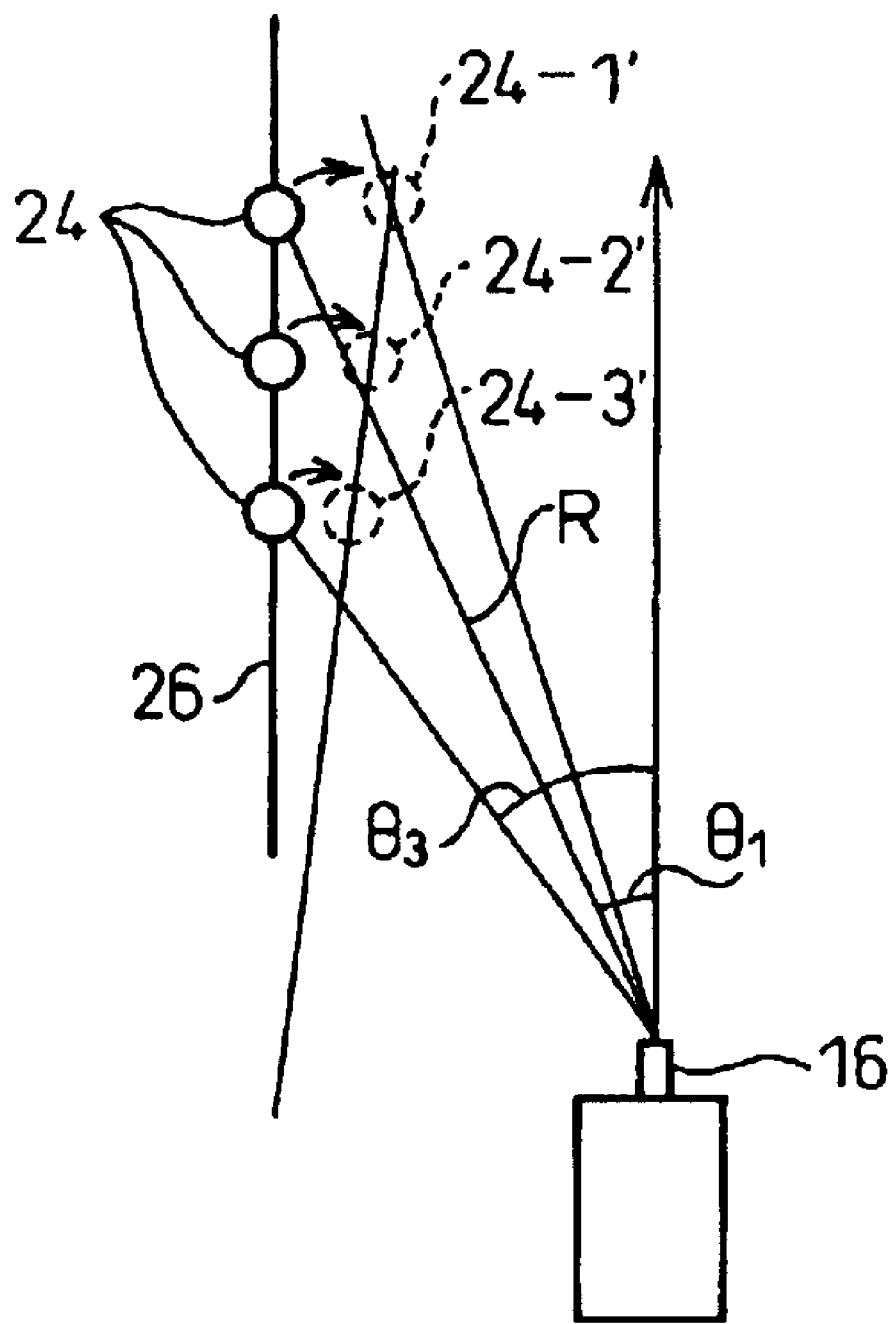
FIG. 6 is a diagram for explaining how the amount of the axis displacement in the horizontal direction is determined.

Suppose that the center axis of the radar is displaced by $\Delta\theta$ to the left, as shown in FIG. 5; then, at time $T_1$, the stationary target 24 is detected, as indicated by 24-1' in FIG. 6, as if it is displaced by $\Delta\theta$ to the right relative to the angle $\Delta_1$ where it should be. Likewise, at times $T_2$ and $T_3$, the stationary target 24 is detected as if it is displaced by $\Delta\theta$ to the right relative to $\theta_2$ and $\theta_3$, respectively, as indicated by 24-2" and 24-3' in FIG. 6.

Figure 7:
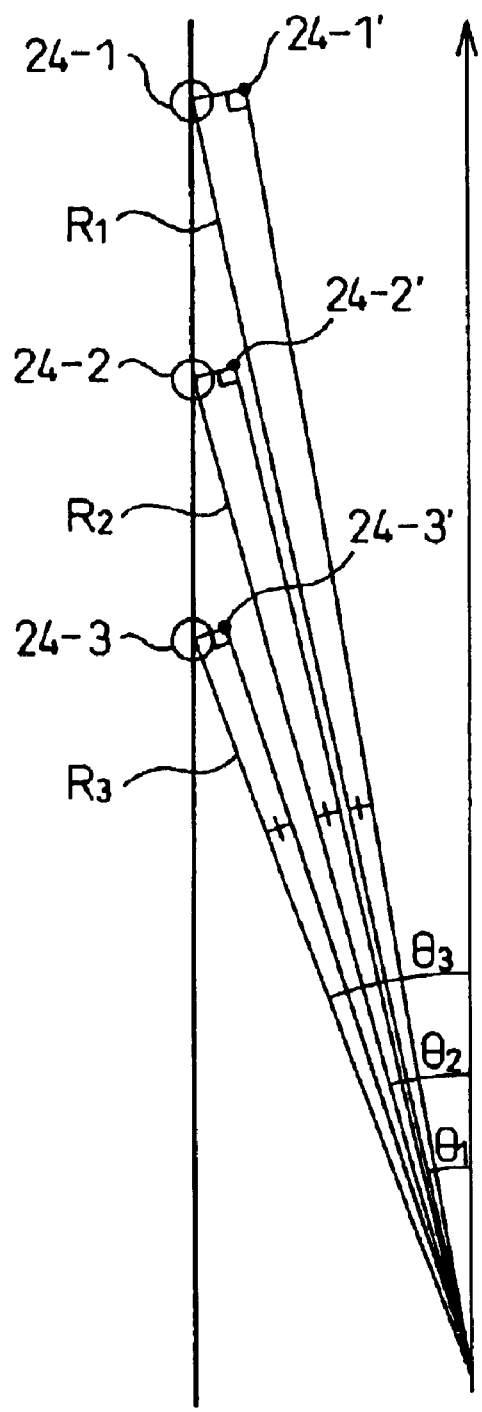
FIG. 7 is a diagram for explaining how the amount of the axis displacement in the horizontal direction is determined.
Figure 8:
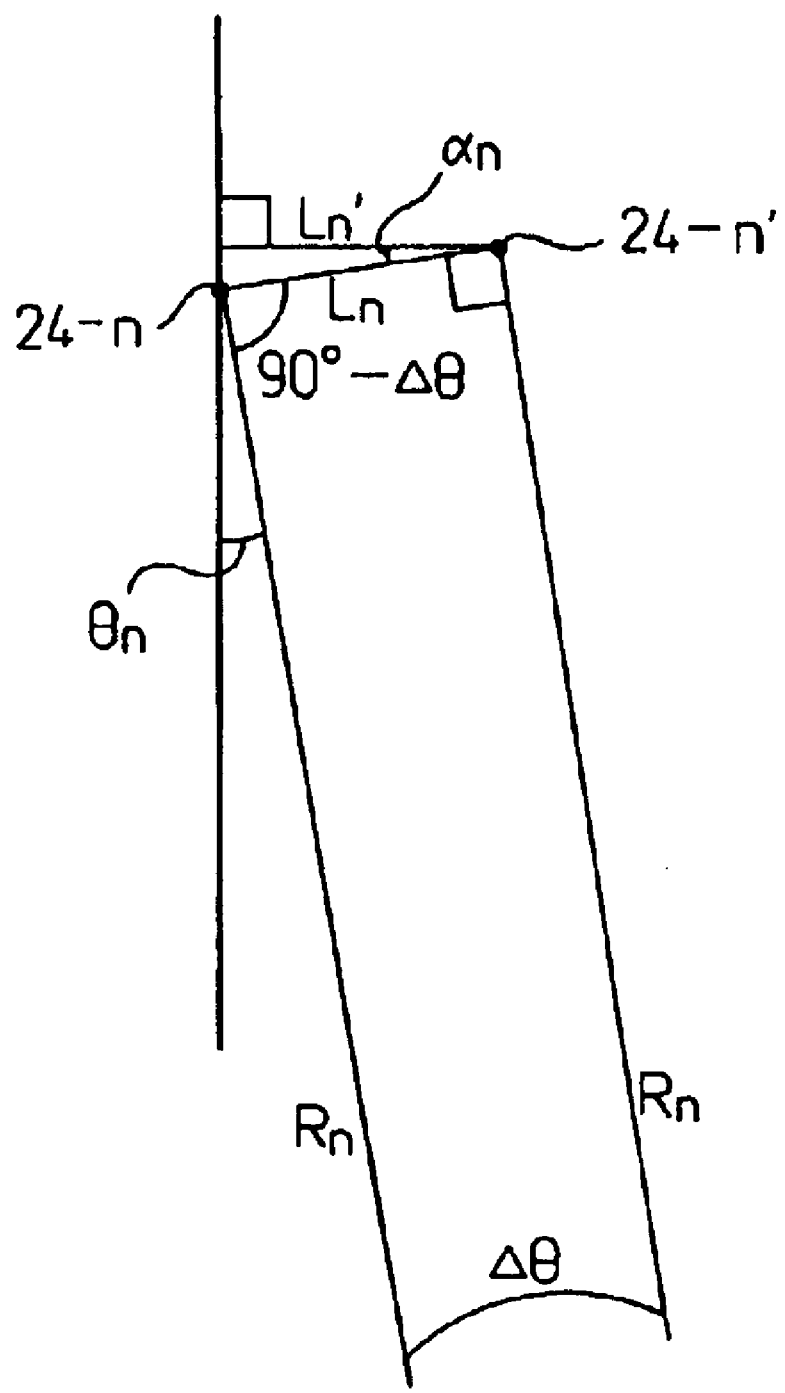
FIG. 8 is a diagram for explaining how the amount of the axis displacement in the horizontal direction is determined.

Here, if the stationary target 24 is at a sufficient distance away, and the distances $R_1$, $R_2$, and $R_3$ are sufficiently great and $\Delta\theta$ sufficiently small, then 24-1', 24-2', and 24-3' can be approximated as shown in FIG. 7, so that the distance $L_n$ between arbitrarily taken positions 24-n and 24-n' can be expressed as $$L_n = R_n \cdot \sin \Delta\theta$$

and $L_n'$ in FIG. 8 can be approximated by $L_n$ if $$\alpha_n = \theta_n - \Delta\theta$$

is sufficiently small.

Figure 9:
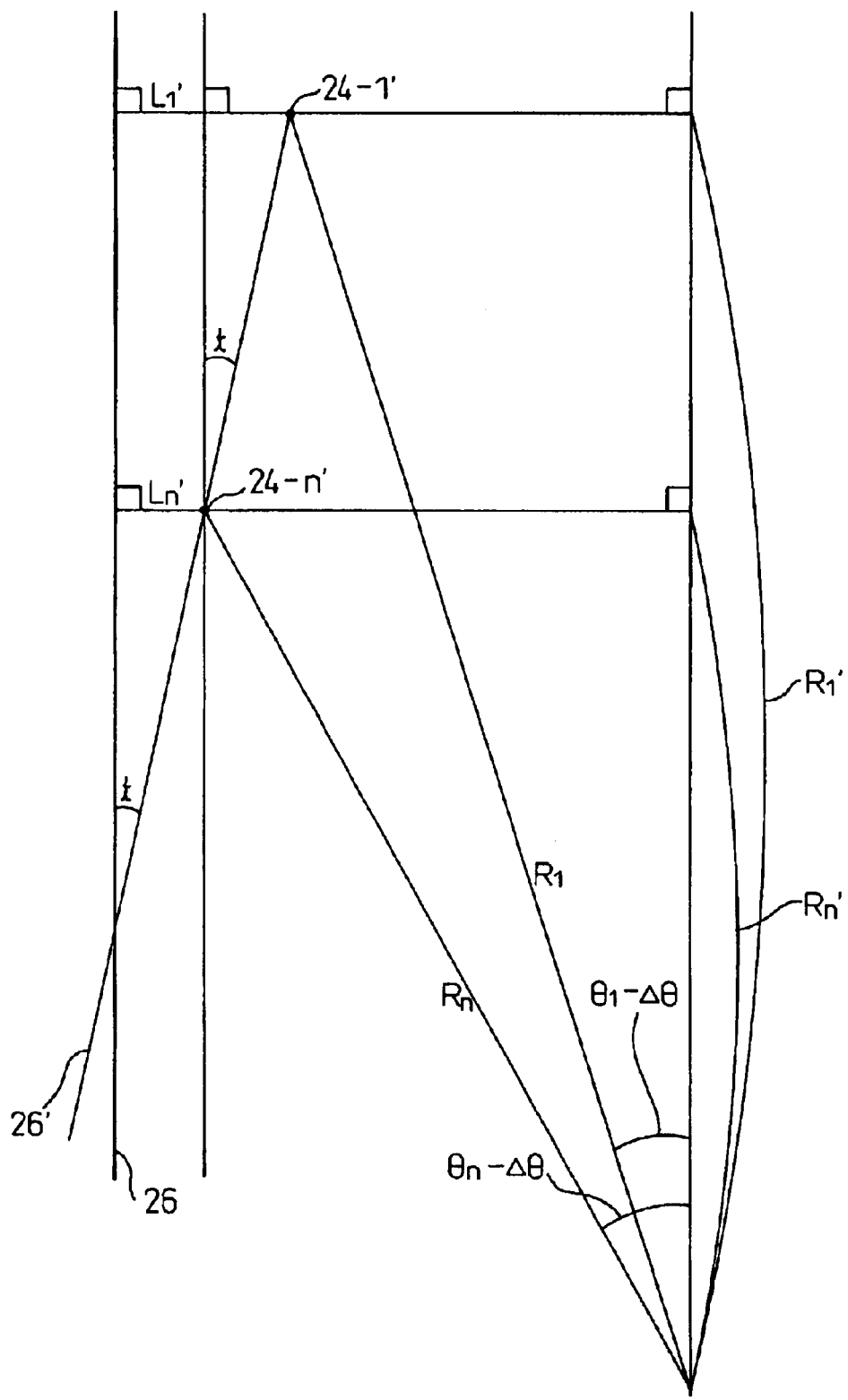
FIG. 9 is a diagram for explaining how the amount of the axis displacement in the horizontal direction is determined.

If the detection angle $\theta_n - \Delta\theta$ of the stationary target 24 is sufficiently small then, as $R_1', \ldots, R_n'$ in FIG. 9 can be approximated by $R_1, \ldots, R_n$, the slope t of the locus 26' joining 24-1', ..., 24-n' (which can be approximated by a straight line) can be expressed as $$\tan t = (L_1 - L_n)/(R_1 - R_n)$$
$$= (R_1 \cdot \sin\Delta\theta - R_n \cdot \sin\Delta\theta)/(R_1 - R_n)$$
$$= \sin\Delta\theta((R_1 - R_n)/(R_1 - R_n)$$
$$= \sin\Delta\theta$$

Further, if $\Delta\theta$ is sufficiently small, it can be approximated as $$\sin t = \sin \Delta\theta$$
$$t = \Delta\theta$$

Accordingly, if $\Delta\theta$ is sufficiently small, and if the stationary target 24 is at a sufficient distance away, and the detection angle $\theta_n - \Delta\theta$ is sufficiently small, then the angle $\Delta\theta$ of the radar axis displacement can be detected approximately as the slope t of the locus 26' of the stationary target 24.

When correcting the azimuth angle $\theta$ by using the axial displacement angle $\Delta\theta$ thus determined, it is desirable that it be corrected, for example, as $\theta - \Delta\theta 2$, not as $\theta - \Delta\theta$, repeatedly determining the axis displacement amount $\Delta\theta$ in the horizontal direction by using the corrected azimuth angle $\theta$.

If the correction is to be applied to the calculated result of the azimuth angle $\theta$, then when the measurement range is $\pm 8°$ and the amount of correction is $-2°$, for example, the measurement range will be from $-10°$ to $+6°$, that is, the measurement range on the positive side will become smaller. Therefore, it is desirable that the correction be applied, not to the calculated result of the angle, but to the encoder output that indicates the projection direction when mechanically scanning the projection direction.

The axis displacement determination process and the axis displacement correction process described above can be implemented using software in the ECU 10. It is desirable that the determined amount of the axis displacement be stored in a non-volatile memory.

The above description has been given by taking an FM-CW radar as an example, but it will be appreciated that the present invention is also applicable to other types of radar, for example, a laser radar.

What is claimed is:

1. A method of detecting an occurrence of a radar axis displacement in a horizontal direction from a radar axis of a radar mounted on a vehicle, the radar axis being located coincident with a forward direction of the vehicle, comprising:

measuring a frequency with which vehicle-to-vehicle distance control being performed using said radar is released or re-set; and determining that the radar axis of said radar is displaced in the horizontal direction when said measured control release or re-get frequency is higher than a predetermined threshold.

2. A method of determining an amount of a radar axis displacement in a horizontal direction from a radar axis of a radar mounted on a vehicle, the radar axis being located coincident with a forward direction of the vehicle, comprising:

recognizing that a target detected by said radar is a stationary target; and determining the amount of the radar axis displacement in the horizontal direction, based on a locus of said target recognized as being the stationary target.

3. The method as claimed in claim 2, wherein the radar axis displacement amount determining includes determining the amount of the radar axis displacement from a slope of the locus.

4. A method of correcting a radar axis displacement in a horizontal direction from a radar axis of a radar mounted on a vehicle, the radar axis being located coincident with a forward direction of the vehicle, comprising:

recognizing that a target detected by said radar is a stationary target;

determining an amount of the radar axis displacement in the horizontal direction, based on a locus of said target recognized as being the stationary target; and correcting azimuth angle of said target by using said determined amount of the radar axis displacement in the horizontal direction.

5. The method as claimed in claim 4, wherein the radar axis displacement amount determining includes determining the amount of the radar axis displacement from a slope of the locus.

6. An apparatus for detecting an occurrence of a radar axis displacement in a horizontal direction from a radar axis of a radar mounted on a vehicle, the radar axis being located coincident with a forward direction of the vehicle, comprising:

means for measuring a frequency with which vehicle-to-vehicle distance control being performed using said radar is released or re-set; and means for determining that the radar axis of said radar is displaced in the horizontal direction when said measured control release or re-set frequency is higher than a predetermined threshold.

7. An apparatus for determining an amount of a radar axis displacement in a horizontal direction from a radar axis of a radar mounted on a vehicle, the radar axis being located coincident with a forward direction of the vehicle, comprising:

mean for recognizing that a target detected by said radar is a stationary target; and means for determining the amount of the radar axis displacement in the horizontal direction, based on a locus of said target recognized as being the stationary target.

8. The apparatus as claimed in claim 7, wherein the radar axis displacement amount determining means includes means for determining the amount of the radar axis displacement from a slope of the locus.

9. An apparatus for correcting a radar axis displacement in a horizontal direction from a radar axis of a radar mounted on a vehicle, the radar axis being located coincident with a forward direction of the vehicle, comprising:

means for recognizing that a target detected by said radar is a stationary target;

means for determining an amount of the radar axis displacement in the horizontal direction, based on a locus of said target recognized as being the stationary target; and means for correcting azimuth angle of said target by using said determined amount of the radar axis displacement in the horizontal direction.

10. The apparatus as claimed in claim 9, wherein the radar axis displacement amount determining means includes means for determining the amount of the radar axis displacement from a slope of the locus.

11. A computer program on computer-readable medium for controlling detecting an occurrence of a radar axis displacement in a horizontal direction from a radar axis of a radar mounted on a vehicle, the radar axis being located coincident with a forward direction of the vehicle, comprising:

computer code that controls measuring a frequency with which vehicle-to-vehicle distance control being performed using said radar is released or re-set; and computer code that controls determining that the radar axis of said radar is displaced in the horizontal direction when said measured control release or re-set frequency is higher than a predetermined threshold.

12. A computer program on computer-readable medium for controlling determining an amount of a radar axis displacement in a horizontal direction from a radar axis of a radar mounted on a vehicle, the radar axis being located coincident with a forward direction of the vehicle, comprising:

computer code that controls recognizing that a target detected by said radar is a stationary target; and computer code that controls determining the amount of the radar axis displacement in the horizontal direction, based on a locus of said target recognized as being the stationary target.

13. The computer program on computer-readable medium as claimed in claim 12, wherein the computer code that controls determining the amount of the radar axis displacement amount includes computer code that controls determining the amount of the radar axis displacement from a slope of the locus.

14. A computer program on computer-readable medium for controlling correcting a radar axis displacement in a horizontal direction from a radar axis of a radar mounted on a vehicle, the radar axis being located coincident with a forward direction of the vehicle, comprising:

computer code that controls recognizing that a target detected by said radar is a stationary target;

computer code that controls determining an amount of the radar axis displacement in the horizontal direction, based on a locus of said target recognized as being the stationary target; and computer code that controls correcting azimuth angle of said target by using said determined amount of the radar axis displacement on the horizontal direction.

15. The computer program on computer-readable medium as claimed in claim 14, wherein the computer-code that controls determining the radar axis displacement amount includes computer code that controls determining the amount of the radar axis displacement from a slope of the locus.

* * * * *

UNITED STATES PATENT AND TRADEMARK OFFICE
CERTIFICATE OF CORRECTION

PATENT NO. : 6,750,811 B2  Page 1 of 1
DATED : June 15, 2004
INVENTOR(S) : Asanuma et al.

It is certified that error appears in the above-identified patent and that said Letters Patent is hereby corrected as shown below:

Column 1,
Line 50, delete "to the present invention comprises:", insert -- to the present invention, comprises: --

Column 3,
Line 36, delete "$\Delta_1$ where it should be", insert -- $\theta_1$ where it should be --
Line 39, delete "24-2" and", insert -- 24-2' and --

Column 4,
Line 14, delete "as $\theta$- $\Delta$ $\theta 2$,", insert -- as $\theta$- $\Delta$ $\theta/2$, --
Line 44, delete "re-get" insert -- re-set --

Column 6,
Line 45, delete "displacement on the horizontal", insert -- displacement in the horizontal --

Signed and Sealed this

Thirty-first Day of May, 2005

JON W. DUDAS
*Director of the United States Patent and Trademark Office*